United States Patent [19]

Oakes et al.

[11] 3,968,561

[45] July 13, 1976

[54] METHOD OF FABRICATING HOLLOW, FOAM-FILLED, METAL STRUCTURAL MEMBERS

[76] Inventors: Thomas Francis Oakes, Aldwick, Selkirk Gardens, Cheltenham, Gloucestershire; Martin Bridgewater, 2 Highland Road, Charlton, Kings, Cheltenham, Gloucestershire, both of England

[22] Filed: Nov. 18, 1974

[21] Appl. No.: 524,837

Related U.S. Application Data

[62] Division of Ser. No. 349,894, April 10, 1973, abandoned.

[30] Foreign Application Priority Data

Apr. 12, 1972 United Kingdom ............... 16781/72

[52] U.S. Cl. .................................... 29/460; 29/463; 29/526; 264/45.5; 264/46.5; 264/46.6; 264/46.7; 264/DIG. 14

[51] Int. Cl.$^2$ ........................................... B23P 3/00

[58] Field of Search ................. 264/45.5, 46.6, 46.7, 264/DIG. 14, 46.5, 46.9; 156/79; 52/309, 488, 656, 731; 29/460, 463, 526

[56] References Cited

UNITED STATES PATENTS

| | | | |
|---|---|---|---|
| 1,345,904 | 7/1920 | Wishart | 264/DIG. 14 |
| 3,156,332 | 11/1964 | Cameron | 52/731 |
| 3,186,131 | 6/1965 | Denny et al. | 52/461 |
| 3,251,912 | 5/1966 | Fish | 264/46.6 |
| 3,451,696 | 6/1969 | Hagelin et al. | 264/46.6 |
| 3,579,724 | 5/1971 | Toth | 52/656 |
| 3,750,333 | 8/1973 | Vance | 52/488 |

FOREIGN PATENTS OR APPLICATIONS

| | | | |
|---|---|---|---|
| 454,414 | 6/1968 | Switzerland | 52/731 |
| 890,513 | 2/1962 | United Kingdom | 52/309 |

*Primary Examiner*—Robert F. White
*Assistant Examiner*—T. E. Balhoff
*Attorney, Agent, or Firm*—Elliott I. Pollock

[57] ABSTRACT

A hollow structural member formed of thin sheet steel is formed with one or more longitudinal joints and the interior is filled with a rigid lightweight synthetic plastics foam such as polyurethane. Each joint includes folded lips or flanges which are designed to provide a restricted clearance or gap into which the foaming material penetrates and changes from a cellular to a non-cellular composition and also provides an adhesive bond at each joint and a moisture proof seal.

4 Claims, 6 Drawing Figures

METHOD OF FABRICATING HOLLOW, FOAM-FILLED, METAL STRUCTURAL MEMBERS

CROSS REFERENCE TO RELATED APPLICATION

Figure 1:
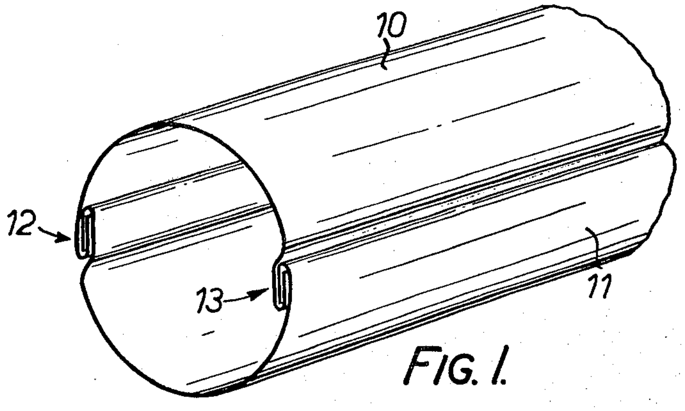

This application is a divisional of our prior, copending application Ser. No. 349,894, filed Apr. 10, 1973, for Hollow Structural Members now abandoned.

This invention relates to the manufacture of hollow structural members and it is a general object of the invention to provide an economical process of manufacturing an elongated structural member of light weight and appreciable strength which will also have some of the advantages discussed below.

The construction or fabrication of the hollow external shell or casing of such a hollow structural member is a relatively expensive process and if the shell is extruded for example, the wall thickness cannot easily be reduced beyond a certain limit so that the shell does tend to be heavier than is necessary and its shape and characteristics are also limited in various respects. Also if a coated sheet metal wall is used, such as a plastics coated thin steel sheet, it is difficult or impossible to join the sheet by welding without damaging the coating.

Now broadly stated the invention consists in a composite structural member comprising an outer wall, sheath, or skin, formed of a stiff or rigid sheet material, with at least one continuous longitudinal joint, and an internal rigid foam filling which penetrates at least partly into the joint and adheres to the two parts of the joint. The foam filling is conveniently a polyurethane foam, which is of relatively low density in the main cavity and is of higher density in the joint.

Preferably the outer wall comprises at least one thin sheet metal strip bent or rolled to the required profile, and in many applications of the invention the outer wall is formed at least partly of sheet steel.

The joint may be made initially porous, or designed to provide a continuous or interrupted gap extending along the length of the joint, to allow air to escape and permit the fluid foaming material to enter the joint. This helps in forming a rigid joint by improving the adhesion, and also allows the foam material to fill the joint and so provide a fluid-tight seal. Alternatively the joint may be closed temporarily by a sealing strip, which may itself be porous (for example a strip of adhesive fabric or paper tape), which limits the escape of air and effectively prevents the liquid filling material from escaping.

It is also possible to obtain effective results by closing the joint lengthwise, but allowing a small escape path at one or both ends of the joint, or at spaced intervals. In general it is desirable that the joint (with or without a temporary closure) should be designed to encourage or permit the penetration of the internal foam filling material while in its liquid condition, and to limit or constrict the flow of this material in such a way that its density increases and it becomes substantially non-cellular.

According to a preferred feature of the invention the wall of the hollow member is formed in two or more separate longitudinally extending parallel lengths, with two or more longitudinal joints, and it is of especial advantage that the hollow wall should be self-supporting before the interior is filled with foam so as to act as a mould for the foam filling.

The invention also resides in an assembly or structure comprising two hollow structural members joined end-to-end or at an angle, with or without an internal coupling member, both members being filled with a rigid foamed material which also penetrates into and between the jointing surfaces and provides internal compression strength for each individual member and bending or shear strength at the joint.

Figure 2:
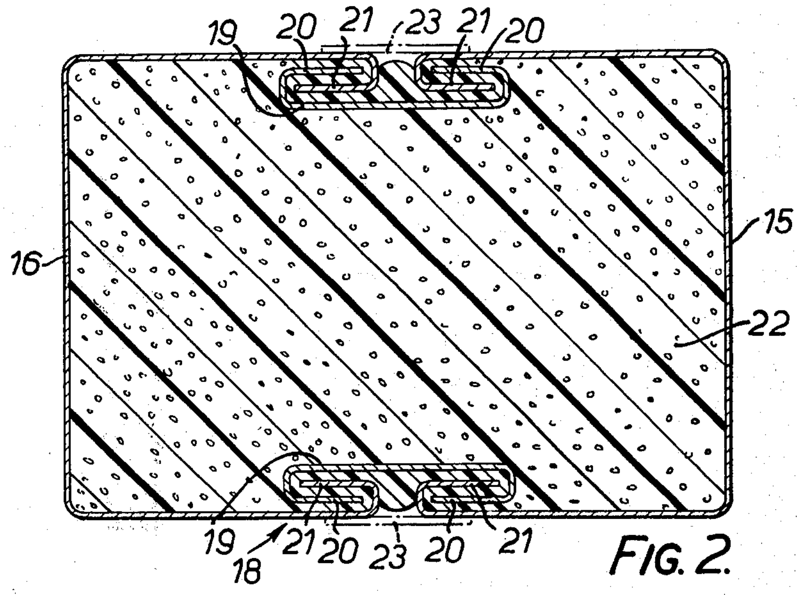
Figure 3:
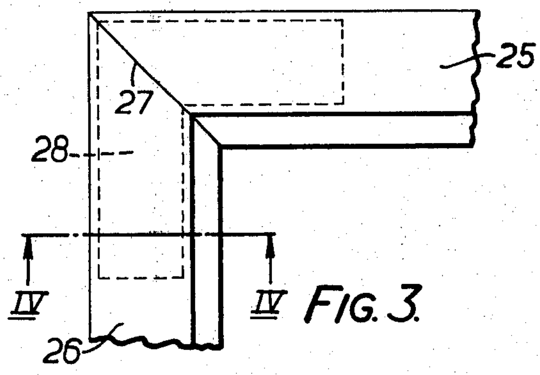
Figure 4:
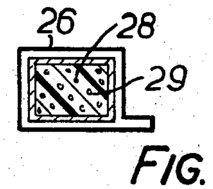
Figure 5:
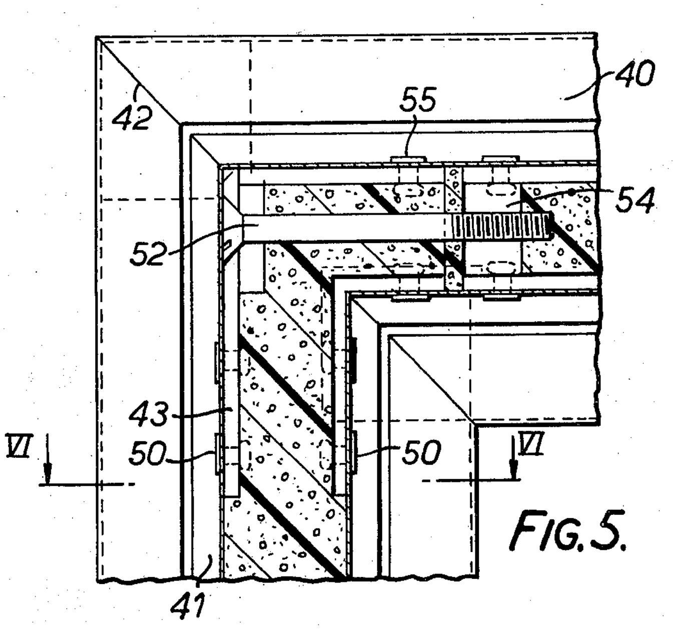
Figure 6:
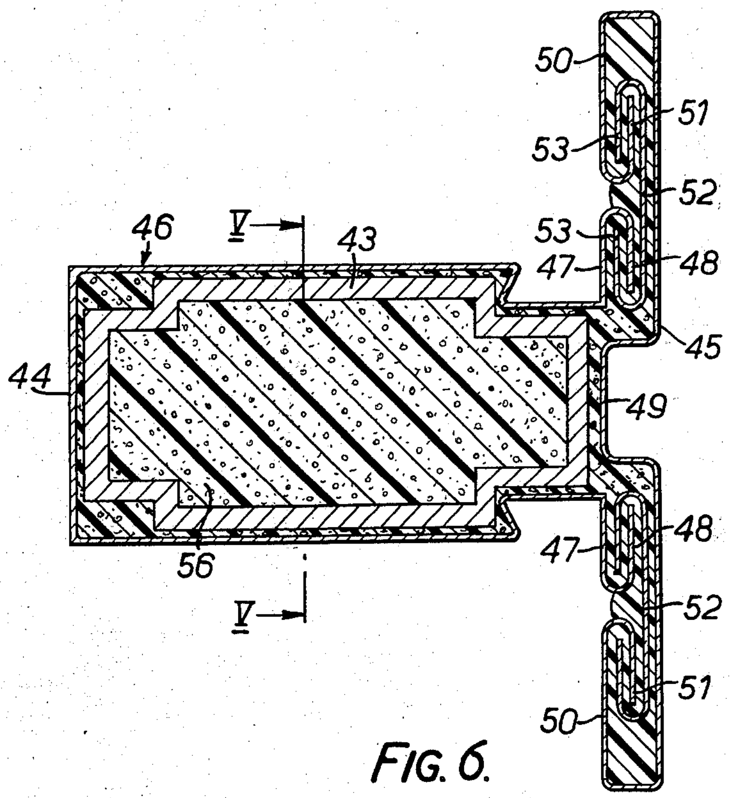

The invention may be performed in various ways and several embodiments with a number of modifications will now be described by way of example, with reference to the accompanying drawings, in which:

FIG. 1 is a diagrammatic general perspective view, partly in section, of the outer wall of an elongated hollow structural member according to the invention, before being foam filled, FIG. 2 is a cross-section through another form of structural member according to the invention, FIG. 3 is a plan view of a corner joint between two hollow structural members according to the invention, FIG. 4 is a somewhat simplified cross-section on the line IV — IV in FIG. 3, FIG. 5 is a fragmentary side elevation, similar to FIG. 3, of a practical form of corner joint for a window frame according to the invention, the view being in section on the line V — V in FIG. 6, and FIG. 6 is a cross sectional view through the construction of FIG. 5 on the line VI — VI.

In the structural member illustrated in FIG. 1 the member has an outer wall formed in two parts 10 and 11 each of thin sheet metal strip, bent to approximately semicircular profile, for example by a simple roll forming process. The two strips may be of the same material, but in some examples one strip may be formed of a relatively expensive non-corrosive material such as stainless steel while the other is formed of a cheaper material such as mild steel. The two strips are formed with interlocking joints along their adjacent edges (12 and 13), and in this example the joints are formed simply by folded flanges along the edges of the metal strips, which loosely interlock with each other when assembled. The two shaped strips can thus be pre-fabricated and assembled by relative lengthwise movement and are then loosely interlocked to form a hollow self-supporting tube as shown in FIG. 1. It will be noted that this assembly operation does not require any final clenching or nipping of the folded metal joints after assembly. When so assembled the two longitudinal joints 12, 13, though reasonably "tight" in normal appearance, are deliberately designed to be non-airtight, or air permeable, to an extent which will be explained below.

After fabrication the ends of the tube are closed off by plugs, and the interior of the hollow tube so formed is filled with a polyurethane foaming mixture of known type, selected to produce a final rigid foam of relatively high density, i.e., having a density of about 5 lbs/cu. ft. and possibly up to about 10 lbs/cu. ft. When initially introduced this material is extremely fluid and under its own self-generated internal pressure within the closed tube it penetrates into the two joints 12, 13 and provides an adhesive between the two parts of each joint. The gap between the folded sheet metal parts at each joint is designed to allow air trapped within the cavity of the tube and within the joint itself to be displaced by the polyurethane material, but at the same time to restrict and constrict the flow of fluid polyurethane. In these conditions the composition of the polyurethane changes from a relatively low density cellular structure in the main cavity of the tube to a relatively high density solid or non-cellular structure in the joint itself. When solidified the polyurethane acts as an extremely strong adhesive and in addition forms a continuous fluid-tight seal along each joint which will prevent or restrict penetration of water or moisture into the interior of the complete structure. The layer or film of polyurethane within each joint also provides a degree of thermal insulation between the two metal parts 10, 11, which is of advantage in window frame constructions.

The structure so formed has shear continuity in the sense that the two wall parts or shells 10, 11 are rigidly secured to each other, so that the composite member has good torisonal and bending strength, and it will be noted that the adhesive bonding at the two joints is formed simultaneously with the foam filling and requires no special process such as welding or an additional bonding step.

In the construction illustrated in FIG. 2 the two thin sheet metal shell sections 15, 16, are not directly interconnected at the joints 17, 18, but each joint includes an intermediate longitudinal connecting strip 19 which has inturned lips 20 along both opposite edges, fitting loosely within corresponding folded lips 21 on the main shells 15, 16. These connecting strips 19 may be formed of thin sheet steel as in the case of the shells 15, 16, or they may be formed of rigid plastics or other thermal insulating materials. In the final stage of manufacture a polyurethane foaming mixture is introduced into the main cavity of the member to fill the whole interior as indicated at 22, and simultaneously the fluid polyurethane penetrates into and between each of the joints, where it changes in consistency from a cellular foam to a solid homogeneous material and forms an adhesive bond, a thermal barrier, and a fluid-tight seal, between the two shells 15, 16 and the strips 19.

A particular advantage of the methods of construction involved in these two examples is that the initial fabrication and assembly of the metal coomponents is greatly simplified and each joint can be quite loose. For example the lips or edges 21 of the two metal shell members 15, 16, in FIG. 2 can be bent over in a standard bending process and the joining channel strips 19 can then be easily inserted into position lengthwise. No clenching operation is needed and therefore it is unnecessary to support the assembly internally while pressure for a clenching stage is applied externally.

It will also be noted that the solid polyurethane plastics material occupies all the gaps between the metal components and forms an effective thermal barrier which is extremely useful in structures such as window frames exposed on opposite sides to the internal room temperature and the external atmospheric temperature. This thermal barrier or insulation effect can be further improved by using joining elements 19 which are themselves thermally insulating e.g. they may be formed of synthetic plastics or they may be coated with a layer of plastics.

In the actual process of forming a structure as shown in FIG. 2 it may be useful to apply a temporary perforated or porous adhesive tape 23 along each of the joints, as illustrated in dotted lines, in order to allow air to escape while the plastic is penetrating through the joint but to prevent the fluid polyurethane from escaping at the gap between the two metal shells. When the polyurethane has solidified the strips 23 are then removed.

It has been found that the result of the natural exothermic reaction of the polyurethane, combined with the oxidising effect arising from contact of the polyurethane with air at the joint results in a very surprising adhesive bond which is effective with several materials which are normally difficult in this respect, including ABS (acrylonitrile butadiene styrene) and PVC (polyvinyl chloride).

The corner joint illustrated in FIGS. 3 and 4 comprises two hollow foam filled structural members 25, 26, mitered at their adjacent ends to form a 45° joint 27, and connected by an internal hollow right-angled coupling sleeve 28, which has two limbs fitting respectively into the open ends of the two members. The sleeve is not a tight fit within the members 25, 26 and some slackness is provided to permit air to escape and to allow the foam material, when introduced initially in fluid form, to penetrate around the sleeve and into the joint 27. After the two members have been assembled over the coupling sleeve the whole interior is filled under pressure with polyurethane foam 29 which passes through the hollow interior of the sleeve 28, forms a continuous structural connection around the corner, and also fills the inter-face at the joint 27 and provides an adhesive connection and a fluidtight seal. As in the previous examples the joint is so formed that in penetrating into the gaps of the joint the structure of the polyurethane changes and becomes a relatively solid non-foamed adhesive in the joint itself, the gaps being so designed that air can escape without the polyurethane exuding to any substantial extent.

The corner joint illustrated in FIGS. 5 and 6 consists essentially of two hollow elongated foam filled frame members 40 and 41, both of identical cross section, joined at a mitred 45° angle joint 42 with an internal hollow reinforcing corner piece 43.

As illustrated in FIG. 6 each member 40, 41, is basically of T-section and is formed by two separate elongated sheet steel members 44, 45. The member 44 is rollformed to provide the main hollow rectangular section 46 and the two edges of this member are bent outwards as shown at 47 with their extreme edges 48 folded inwards towards each other providing a hook shape as seen in section. The other member 45 is generally flat but has a central groove 49 and both edges are turned inwards at 50 with their extreme lips folded outwards at 51 providing further hooked shaped formations.

It will be noted that the general flat sheet metal member 45 combined with the folded and inturned lips and flanges 47, 48, 50, and 51 provides in effect a pair of multiple layer lateral wings or flanges attached to the main hollow box section 46. These flanges are important features in the design of a frame member for a window.

These lateral flanges also provide the means for rigidly interconnecting the two sheet metal members 44, 45. For this purpose a channel shaped interconnecting strip 52 is inserted lengthwise into each of the lateral flanges, with inturned lips 43 loosely located within the hook shaped formations provided by the folded lips 51 and 48. In FIG. 6 the clearance between these respective parts is exaggerated for clarity and in practice the parts would be simply a loose sliding fit providing clearances of the order of 0.02 to 0.002 inches. The interconnecting strips 52 may be formed of rigid synthetic plastics material, or of sheet metal, or for example of sheet metal coated with a synthetic plastics. The use of a synthetic plastic material is of some advantage in providing a thermal barrier between the two metal components 44 and 45.

The internal reinforcing element 43 may be formed of a rigid synthetic plastics material of the cross-section illustrated in FIG. 6, so as to fit loosely within the hollow metal section 46, leaving a clearance around its edges. This corner reinforcing element is located in the member 41 by means of rivets 50 or other fasteners, and when the two members 40, 41 are initially assembled the corner joint is held together by a fastening screw or bolt 52 which passes through one limb of the corner reinforcing member 43 and enters a screwthread in a clamping piece 54 rivetted in the other hollow member 40. After the screw 52 has been tightened the respective limb of the corner element 43 is fixed to the member 40 by further rivets 55.

Finally the whole of the window frame or other structure, having four or more of the corner constructions as described, is fitted with a fluid polyurethane foaming mixture 56 as described in the previous examples. This fluid polyurethane material penetrates from the hollow box section 46 into the lateral flanges and flows around the interconnecting members 52 and between the interleaved folded lips 51, 53, and 48, 53, in the same general manner as described with reference to FIG. 2. It will be noted however that in this construction the interleaved folds 51, 53 and 48, 53 are external and therefore it is possible to apply crimping pressure to these folds without supporting the structure internally as in the case of the FIG. 2 embodiment. This crimping operation at the folded metal lips is performed before the foaming operation but even after crimping there is just sufficient clearance for the above mentioned penetration effect to occur. Again if necessary a perforated adhesive strip may be applied over the parts 47 and 50 to prevent escape of the fluid polyurethane. The fluid polyurethane foaming mixture also passes through and around the internal reinforcing corner member 43 and provides an adhesive bond between this member and the two metal parts 40 and 41, and a continuous structural joint around the corner and in addition an adhesive bond and moisture seat at the joint 42.

We claim:

1. The method of constructing a structural member for use in an architectural or building panel, comprising the steps of fabricating a pair of hollow frame members, each of said frame members being fabricated by shaping a pair of elongted thin sheet metal strips to desired cross-sectional profiles, assembling said profiled strips into a comparatively weak, hollow frame member by positioning the shaped strips in general alignment with one another with the profiled portions of said strips being in opposing spaced relation to one another and with each elongated edge of each strip being disposed adjacent to but spaced from an elongated edge of the other strip, said assembly step for each frame member further comprising bridging the space between the edges in each pair of adjacent edges of said two strips by means respectively of two elongated thermal insulating members which extend respectively along the two pairs of adjacent spaced edges to form two spaced longitudinal joints in said hollow frame member, each of said insulating members being in loose engagement with its associated pair of elongated strip edges at the time of said assembly step to define a gap which extends along each of said joints and through which air may escape from the interior to the exterior of said hollow frame member, positioning said pair of frame members in closely adjacent end-to-end relation to one another, interconnecting said pair of closely adjacent hollow frame members by inserting a hollow reinforcing member having two communicating hollow limbs into the adjacent hollow ends of said pair of hollow frame members respectively to conceal said reinforcing member completely within said frame members, said hollow reinforcing member being fit loosely into each of said frame members to provide a clearance between the exterior of said reinforcing member and the interior facing surfaces of said frame members, and thereafter strengthening said hollow frame members with a rigidifying plastic material by introducing plastic foam material in fluid form into the spaces between said pairs of profiled strips to completely fill each of said hollow frame members and to extend continuously between said two frame members via the communicating hollow limbs of said reinforcing member while displacing air from the interior of said reinforcing member and the interiors of said hollow frame members via said gaps in said joints, said plastic foam introducing step being continued to an extent sufficient to cause said plastic foam material to penetrate into each of said longitudinal joints and into said clearance to close each of said gaps and to form an adhesive bond connecting each of said thermal insulating elements to its associated pair of elongated strip edges thereby to fixedly connect the pair of metal strips in each frame member to one another along said joints and to fixedly connect said pair of frame members to one another at said reinforcing member, the portions of said introduced plastic foam material which penetrate into each of said joints and into said clearance changing in consistency at the time of penetration from a cellular foam to a solid homogeneous material to cause said plastic material to exhibit a higher density in said joints and clearance than in the main spaces within said hollow frame members.

2. The method of claim 1 including the step of mitering the ends of said pair of frame members prior to positioning said frame members in end-to-end relation thereby to form a corner structure.

3. The method of claim 1 wherein said shaping step includes the step of forming a folded lip along each elongated edge of each of said strips, each of said thermal insulating members comprising an elongated member having folded lips along its opposing edges for interengagement with the folded lips of said strips, said assembly step comprising applying crimping pressure to the interengaged folded lips of said strips and insulating members, to hold said strips and thermal insulating members in mechanically engaged relation with one another while still providing said gap along each of said joints, prior to said filling step.

4. The method of claim 1 wherein said pair of thin sheet metal strips are different in metallic composition from one another.

* * * * *